(12) United States Patent
Carrere (10) Patent No.: US 9,927,125 B2
(45) Date of Patent: Mar. 27, 2018

(54) TWO-CIRCUIT INJECTOR FOR A TURBINE ENGINE COMBUSTION CHAMBER

(71) Applicant: TURBOMECA, Bordes (FR)

(72) Inventor: Bernard Carrere, Pau (FR)

(73) Assignee: TURBOMECA, Bordes (FR)

( * ) Notice: Subject to any disclaimer, the term of this patent is extended or adjusted under 35 U.S.C. 154(b) by 261 days.

(21) Appl. No.: 14/432,952

(22) PCT Filed: Sep. 23, 2013

(86) PCT No.: PCT/FR2013/052205
§ 371 (c)(1),
(2) Date: Apr. 1, 2015

(87) PCT Pub. No.: WO2014/053730
PCT Pub. Date: Apr. 10, 2014

(65) Prior Publication Data
US 2015/0260406 A1    Sep. 17, 2015

(30) Foreign Application Priority Data

Oct. 1, 2012 (FR) ..................................... 12 59287

(51) Int. Cl.
*F02C 1/00* (2006.01)
*F23R 3/30* (2006.01)
(Continued)

(52) U.S. Cl.
CPC ................. *F23R 3/30* (2013.01); *F02C 3/14* (2013.01); *F02C 7/264* (2013.01); *F23D 11/446* (2013.01); *F23R 3/343* (2013.01); *Y02T 50/671* (2013.01)

(58) Field of Classification Search
CPC .. F23R 3/20; F23R 3/283; F23R 3/343; F02C 7/26; F02C 7/262; F02C 7/264; F23D 11/42
See application file for complete search history.

(56) References Cited

U.S. PATENT DOCUMENTS 2,949,012 A * 8/1960 Guillaume ................ F23R 3/30
60/738
2,972,231 A * 2/1961 Mullen, II ............... F02C 7/264
60/39.823
(Continued)

FOREIGN PATENT DOCUMENTS

CH          288548       1/1953
CH          326697       12/1957
(Continued)

OTHER PUBLICATIONS

Preliminary Search Report and Written Opinion dated Jun. 6, 2013 in French Patent Application No. 1259287(with English Translation of Category of Cited Documents).
(Continued)

*Primary Examiner* — Gerald L Sung
(74) *Attorney, Agent, or Firm* — Oblon, McClelland, Maier & Neustadt, L.L.P.

(57) ABSTRACT

A start-up injector for a turbine engine combustion chamber, said injector including a fuel injection circuit; and a fuel ignition circuit including a fuel injector supplied by the fuel injection circuit and a spark plug for igniting the injected fuel. The start-up injector also includes a partitioned enclosure including a first compartment in which the fuel is ignited by the spark plug and a second compartment separated from the first compartment by a thermally conductive partition; and a main combustion start-up circuit which includes at least one fuel injector supplied by the fuel injection circuit and opens into the second compartment of the enclosure such as to inject the fuel against the wall.

8 Claims, 5 Drawing Sheets

(51) Int. Cl.
  *F23R 3/34* (2006.01)
  *F23D 11/44* (2006.01)
  *F02C 3/14* (2006.01)
  *F02C 7/264* (2006.01)

(56) References Cited

U.S. PATENT DOCUMENTS

| | | | | |
|---|---|---|---|---|
| 4,944,153 | A * | 7/1990 | Goerlich | F01N 3/025 60/286 |
| 5,167,122 | A | 12/1992 | Shekleton | |
| 6,322,353 | B1 * | 11/2001 | Stalder | F02C 7/264 431/158 |
| 2003/0019215 | A1 * | 1/2003 | Stalder | F02C 7/264 60/776 |
| 2005/0053876 | A1 * | 3/2005 | Joos | F02C 7/264 431/6 |
| 2013/0305726 | A1 | 11/2013 | Carrere | |
| 2014/0366551 | A1 * | 12/2014 | Prociw | F23R 3/14 60/776 |
| 2015/0316267 | A1 * | 11/2015 | Dolmansley | F23R 3/343 60/776 |

FOREIGN PATENT DOCUMENTS

FR 2 971 039 8/2012
GB 914906 1/1963

OTHER PUBLICATIONS

International Search Report and Written Opinion dated Jun. 5, 2014 in PCT/FR2013/052205 (with English Translation of Category of Cited Documents).
International Search Report dated Jun. 5, 2014 in PCT/FR2013/052205 Filed Sep. 23, 2013.

* cited by examiner

| Step | Spark plug 101 | Ignition injector 130 | Start-up injector 140 | Ignition chamber | Purge |
|---|---|---|---|---|---|
| 200 | OK | | | | |
| 210 | OK | OK | | | |
| 220 | OK | OK | OK | | |
| 230 | OK | OK | OK | OK | |
| 240 | | | | OK | |
| 250 | | | | OK | OK |

FIG. 7

TWO-CIRCUIT INJECTOR FOR A TURBINE ENGINE COMBUSTION CHAMBER

FIELD OF THE INVENTION

The field of the invention is that of combustion chamber injectors of turbine engines, especially combustion start-up injectors.

The invention also relates to turbine engines fitted with such injectors.

PRIOR ART

Figure 1:
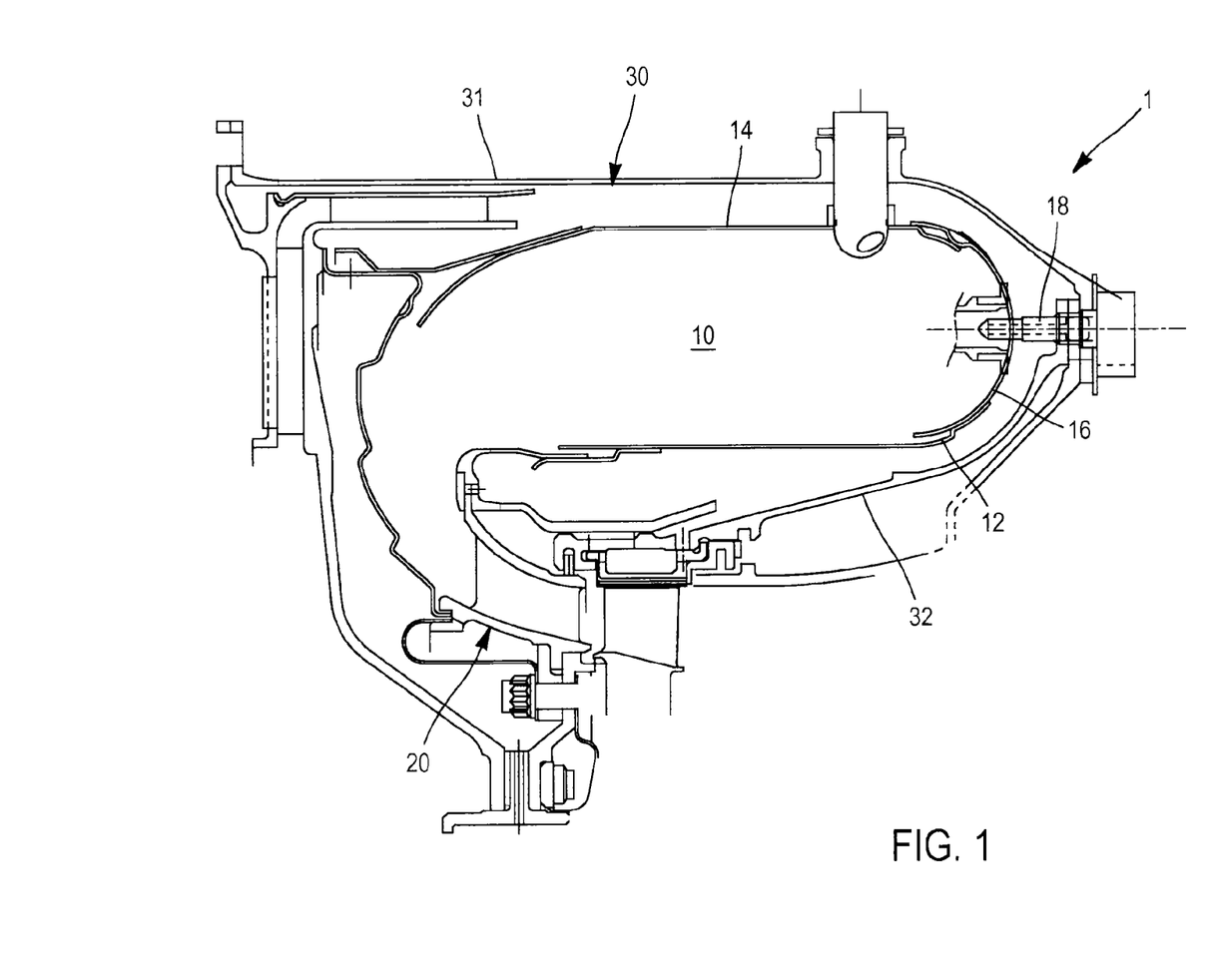
FIG. 1, already described, is a sectional view of a turbine engine casing at the level of the combustion chamber.

In reference to FIG. 1, turbine engines 1 conventionally comprise a combustion chamber 10 and a distributor 20 housed in a casing 30, the combustion chamber being delimited by external 14 and internal 12 walls of revolution, one extending inside the other and being connected by an annular bottom wall 16 of the chamber.

The casing also has an internal wall 32 and an external wall 31 to which the internal 12 and external walls of the combustion chamber are respectively fixed.

A mix of air and fuel is injected into the combustion chamber by a plurality of injectors 18 mounted on the chamber bottom wall, and distributed over the entire circumference of the latter.

Several types of injectors are arranged in a combustion chamber, including start-up injectors, which comprise an atomizer injecting the mixture of air and fuel, and a spark plug igniting this mixture.

To characterise injectors a quantity called Flow Number (FN) is used, equal to the flow rate in L/H of the injector divided by the pressure in bars of the injected mixture. Start-up injectors have a Flow Number typically between 1.2 and 1.5.

The other injectors are dedicated to post-start-up speeds: transitional acceleration or deceleration speeds and mid-flight speeds. These injectors have a much larger Flow Number, between 9 and 10, that is, their fuel injection flow rate is higher.

These injectors comprise atomizers projecting a mixture of air and fuel onto a hot wall of the combustion chamber, this wall having been heated previously by a start-up injector such that the fuel ignites upon contact.

Conventional start-up injectors have some disadvantages, including a considerable blowing effect, linked to the current of air in the combustion chamber, which prevents start-up or restart-up of the engine since the latter has not slowed to less than 20% of its capacity. An engine which has just been switched off cannot therefore be restarted immediately.

Engines also become embrittled because of the need for two orifices per injector in the combustion chamber and in the casing due to having an atomizer and a spark plug enter inside the chamber.

Also, during start-up of the engine, the whole combustion chamber has to be ignited at once. But, as is known, since the flow rate of start-up injectors is low it is necessary to position a large number of injectors over the entire circumference of the bottom wall of the combustion chamber. This adds weight to the engine and makes it more expensive to produce.

Document U.S. Pat. No. 2,949,012 describes a combustion chamber comprising a start-up injector arranged in a space of the combustion chamber receiving air flow from said chamber. Fuel ignited by this injector heats a wall towards which fuel is injected via a principal injector such that the fuel ignites on contact with the wall.

This assembly in the combustion chamber does not correct the blowing effect, since in particular the start-up injector is exposed to the air flow of the combustion chamber. As a consequence, in case of high engine speed, it is not possible to start up ignition of the fuel.

General Presentation

The aim of the invention is to eliminate at least one of the disadvantages mentioned above. In particular, the aim of the invention is to propose a combustion chamber injector for start-up of the chamber irrespective of the speed of the engine.

Another aim of the invention is to enable faster ignition of the combustion chamber and which is accordingly more economical in fuel.

In this respect, the aim of the invention is a start-up injector of a turbine engine combustion chamber, intended to be arranged on a wall of the combustion chamber and terminate in the latter via an orifice of the wall, the start-up injector comprising:
 a fuel injection circuit,
 a fuel ignition circuit, comprising a fuel injector fed by the fuel injection circuit, and a spark plug of the injected fuel,
 the injector being characterized in that it further comprises:
 a partitioned enclosure comprising a first compartment wherein the ignition of the fuel by the spark plug occurs, and a second compartment separated from the first by a thermally conductive partition, and
 a principal combustion start-up circuit, comprising at least one fuel injector fed by said fuel injection circuit, and terminating in the second compartment of the enclosure while being arranged to inject fuel against said wall.

Advantageously, though optionally, the invention can also comprise at least one of the following characteristics:
 the fuel injection circuit comprises a fuel supply inlet and an overpressure valve blocking the feed of the combustion start-up circuit when the fuel pressure is less than a predetermined threshold.
 the threshold pressure below which the overpressure valve blocks the feed of the combustion start-up circuit is between 2.5 and 3 bar.
 the fuel injector of the start-up circuit is a prevaporisation injector adapted to vaporise the fuel.
 the partitioned enclosure comprises a fuel evacuation opening common to both compartments.
 the spark plug is a glow plug or a spark plug.
 the enclosure has external walls fitted with air admission openings.

Another aim of the invention is a combustion assembly for a turbine engine, comprising a combustion chamber of a turbine engine, and at least one start-up injector according to the invention.

The aim of the invention finally is a turbine engine comprising a combustion chamber and at least one injector according to the invention.

Advantageously, though optionally, the turbine engine according to the invention comprises a casing wherein the combustion chamber is arranged, and the injector is attached to said casing such that:
 the partitioned enclosure enters inside the combustion chamber through the casing and a wall of said chamber,
 the fuel evacuation opening of said enclosure terminates in the combustion chamber, and
 the air admission openings of the walls of said enclosure terminate in an interstice between the casing and the combustion chamber.

The injector proposed by the invention has many advantages.

With the fuel ignition circuit being arranged in an enclosure, the injector is much less exposed to the phenomenon of blowing as the enclosure acts as a pre-combustion chamber whereof the walls confine the air. Ignition of the fuel is therefore faster and considerably reduces the consumption of fuel at start-up.

Also, protection against blowing can start up or restart up the combustion chamber even when the latter has just stopped without the engine having to have slowed to 20% of its capacity.

Due to its principal start-up circuit, the injector has a greater rate of fuel than a traditional start-up injector. This rate ignites a greater proportion of the combustion chamber, and therefore reduces the number of injectors to be used and ignited at the same time. The turbine engine is ignited, and is therefore less expensive to produce and more economical in fuel.

Finally, the injector according to the invention is compact, as it comprises a single fuel injection circuit which feeds both fuel ignition circuits, which requires just one orifice per injector in the walls of the casing and of the combustion chamber.

DESCRIPTION OF FIGURES

Other characteristics and advantages of the invention will emerge from the following description which is purely illustrative and non-limiting, and which much be considered with respect to the appended drawings, in which.

DETAILED DESCRIPTION OF AN EMBODIMENT

Figure 2:
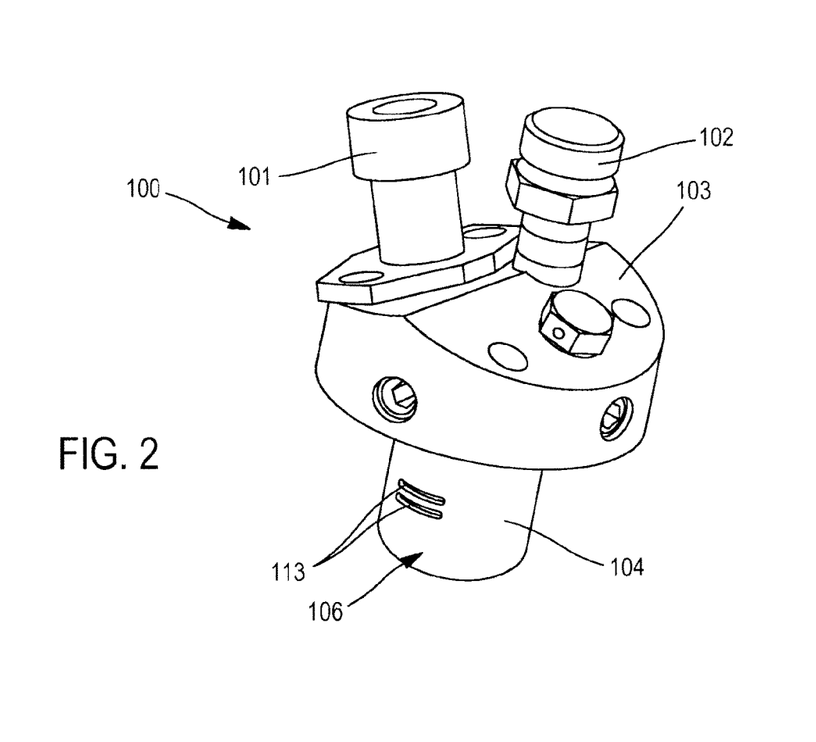
FIG. 2 illustrates an embodiment of an injector according to the invention.

In reference to FIG. 2, this illustrates a start-up injector 100 of a combustion chamber of a turbine engine. It comprises a fuel ignition spark plug 101, and a fuel inlet 102.

The spark plug 101 can be a spark plug, or preferably a glow plug, which has a size reduced relative to the spark plug and decreases the volume of the injector 100.

Figure 3:
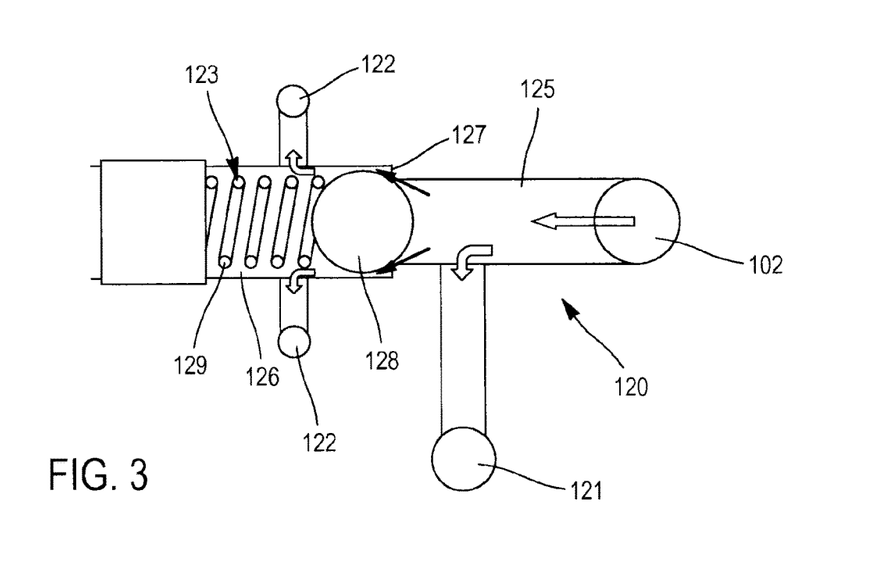
FIG. 3 schematically illustrates a fuel injection circuit of an injector of FIG. 2.

In reference to FIG. 3, the injector 100 comprises a fuel injection circuit 120 in fluid communication with the fuel inlet 102, and with two circuits 130 and 140 intended to ignite the combustion chamber.

With reference again to FIG. 2, the fuel injection circuit is arranged in a hood 103 of the injector, intended to be fixed on the casing 30 of a turbine engine 1, for example by bolting.

An enclosure 104, wherein ignition of the fuel takes place before the latter enters the combustion chamber, projects from the hood 103. As is evident in FIGS. 4a to 4c, the injector is attached to the casing 30 such that this enclosure 104 enters inside the casing 30 via an orifice 33 arranged in the latter.

Figure 4A:
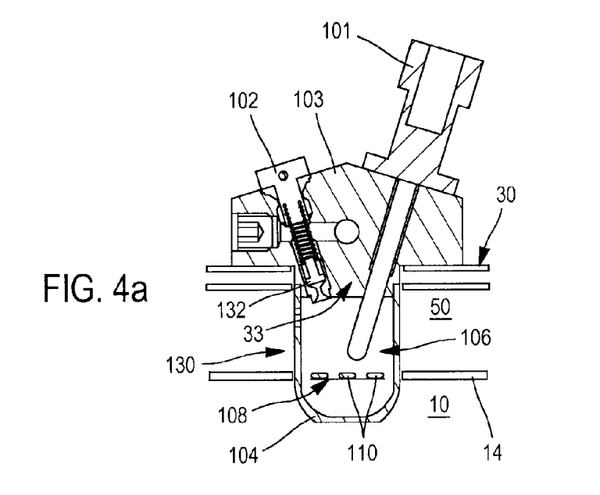
FIGS. 4a to 4c illustrate sectional views of the injector illustrated in FIG. 2, FIG. 4a being a sectional view according to the axis AA illustrated in FIG. 4c, and FIG. 4b being a sectional view according to the axis BB illustrated in FIG. 4c.
Figure 4B:
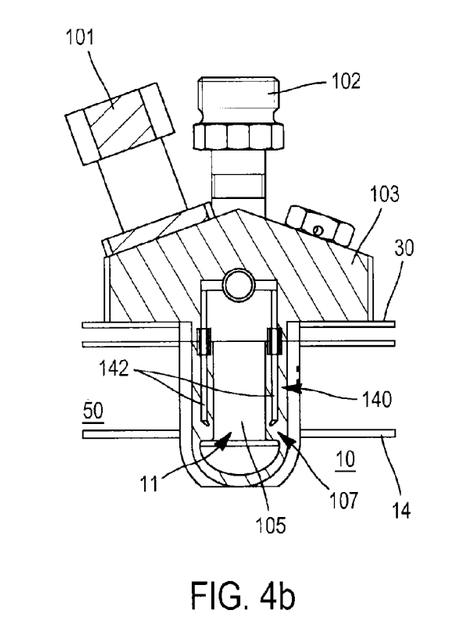
Figure 4C:
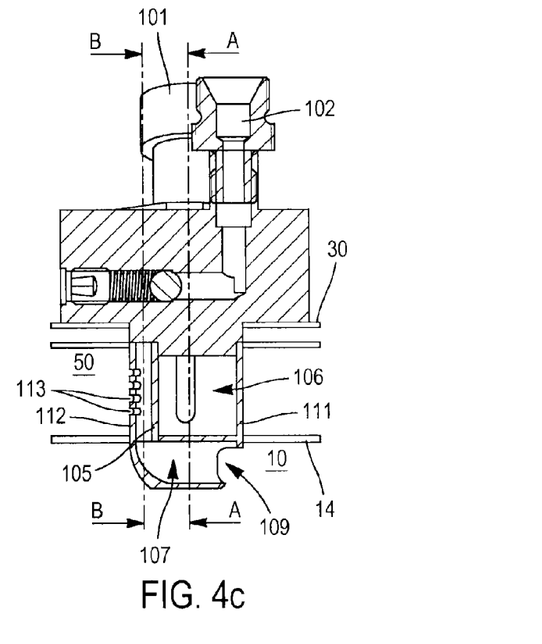

Also, it enters inside the combustion chamber 10 via an orifice 11 arranged in the external wall 14 of the latter, this orifice facing the orifice 33 of the casing.

The enclosure 104 terminates inside the combustion chamber 10 via an evacuation opening 109 of burnt fuel.

In reference to FIGS. 4a to 4c, the enclosure 104 comprises a wall 105 forming a thermally conductive partition between two compartments 106 and 107. This wall 105 is advantageously made of metal, for example steel.

Figure 6:
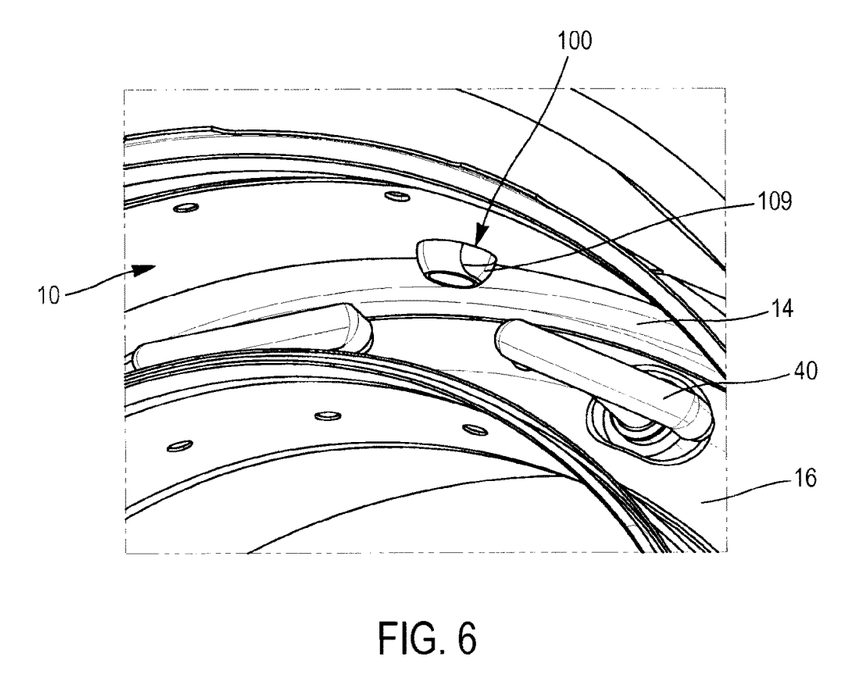
FIG. 6 illustrates the installation of an injector in the combustion chamber of a turbine engine.

As is evident in FIG. 6, showing a view from below of the injector 100, and in FIGS. 4a and 4c, the wall 105 does not fully separate the two compartments 106 and 107.

Indeed, the compartment 106 has an evacuation opening 108 of burnt fuel, this opening terminating in the compartment 107, advantageously near the evacuation opening 109 of the burnt fuel of this compartment 107.

"Near the opening 109" means that the opening 108 terminates in the compartment 107 in a zone sufficiently close to the opening 109 to contain only ignited fuel, the ignition of the fuel taking place further upstream in the compartment 107 relative to the trajectory of the fuel in this compartment.

The opening 108 of the first compartment 106 therefore communicates with the second compartment 107 so that the assembly of the ignited fuel is evacuated from the injector 100 via the opening 109 of the second compartment 107.

The wall 105 forming a partition between the two compartments 106, 107 is held in position by a plurality of spacers 110 which extend across the compartment 106, between the wall 105 and the wall 111 of the partitioned enclosure 104 arranged opposite the latter.

The interstices between these spacers 110 define the opening 108 of the first compartment 106.

Finally, the wall 112 of the partitioned enclosure located opposite the wall 111 relative to the wall 105 is fitted with a plurality of air admission orifices 113, enabling combustion of the fuel in the compartment 107.

Figure 5:
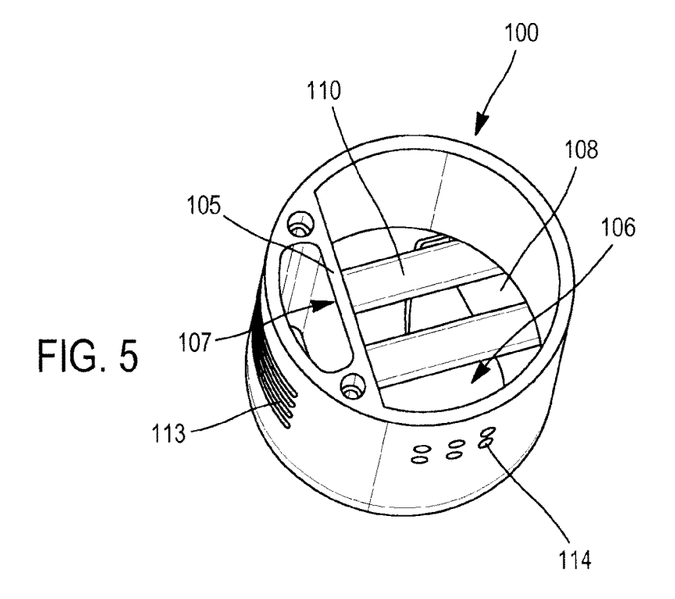
FIG. 5 illustrates a view from below of an injector of FIG. 2.

One of the walls enclosing the compartment 106, for example the wall 111 or one of the walls adjacent to the latter, also comprises air supply orifices 114, evident in FIG. 5.

These orifices terminate in an interstice 50 located between the external wall 14 of the combustion chamber and the corresponding wall 31 of the casing, and wherein air flow circulates.

The two ignition circuits of the combustion chamber 10 will now be described. FIG. 4a illustrates the first ignition circuit 130 of the combustion chamber.

This circuit is a fuel ignition circuit. In this respect, it comprises a fuel injector 132, fed with fuel by the fuel injection circuit 110, and which projects fuel into the first compartment 106 of the partitioned enclosure 104. The injected fuel in the compartment 106 is ignited by an end of the spark plug 101 which enters inside the compartment 106.

The ignited fuel heats the walls of the partitioned enclosure enclosing the compartment 107, and especially the partition 105 separating the first compartment 106 from the second 107.

Once ignited, the fuel is evacuated towards the combustion chamber via the opening 108 then via the opening 109 of the compartment 107.

In reference to FIGS. 4b and 4c, the second ignition circuit of the combustion chamber 140, called principal start-up combustion circuit, since it has a high rate of fuel, causing ignition of the combustion chamber, comprises at least one fuel injector 142, preferably two injectors 142, fed also by the same fuel injection circuit 120.

These injectors 142 are prevaporisation injectors, which project fuel in the form of vapour inside the compartment 107, on contact with sufficiently hot walls of the enclosure 104 to cause ignition of the fuel. Preferably, the injectors 142 are oriented towards the partition 105 heated by the ignition circuit 130 to project fuel against this partition, and so that the fuel ignites on contact with this partition.

The fuel once ignited enters the combustion chamber 10 via the opening 109 of the compartment 107.

An injector 100 positioned on a combustion chamber 10 is illustrated in FIG. 6. The injector is placed on the external annular wall 14 of the combustion chamber and terminates in the latter via the opening 109. Preevaporation rods 40 are also provided to ignite a greater rate of fuel from the ignited fuel injected by the injector 100. These preevaporation rods are arranged on the back wall 16 of the combustion chamber 10.

With reference again to FIG. 3, the fuel injection circuit 120 is common to both ignition circuits 130 and 140 of the combustion chamber. To enable fuel supply adapted to each circuit, the fuel injection circuit comprises a feed outlet 121 of the fuel injector 132 of the first ignition circuit 130, and one or more outlets 122 for feeding as many injectors 142 of the second circuit 140.

Also, an overpressure valve 123 blocks the fuel outlets 122 for fuel pressure less than a given threshold, for example between 2.5 and 3 bars, such that for such a pressure fuel flows only towards the fuel injector 132.

When the fuel pressure exceeds said threshold, the overpressure valve 123 releases the openings 122 to feed the injectors of the second circuit 140.

For this purpose, the overpressure valve 123 comprises a first channel 125 extending from the fuel feed opening 102 and terminating both towards the outlet 121, and also on a second channel 126 of larger diameter than the first channel 125. Due to this, the second channel 126 has a peripheral rim 127 at the level of the junction with the first channel 125.

A ball 128 of diameter greater than the diameter of the first channel 125, but less than that of the second channel 126, is placed in the second channel 126, in sliding relation with the latter.

It is kept supported against the annular rim 127 by a spring 129 whereof the setting, that is, the pressure to be exerted to combat the return force and compress the spring, corresponds to the above threshold pressure to release the feed openings 122 of the injectors of the second circuit 140.

In this way, when the fuel pressure is less than for example 2.5 bars, the ball 128 is stopped up against the rim 127, and due to its diameter greater than that of the channel 125, it blocks the latter. Fuel flows only to the opening 121. When the fuel pressure rises and exceeds the setting of the spring (between 2.5 and 3 bars), this pressure is enough to shift the ball 128 and enable flow of fuel towards the openings 122.

In this latter situation fuel flows towards the openings 122 and the opening 121 at the same time such that the ignition circuit 130 continues to be fed.

Figure 7:
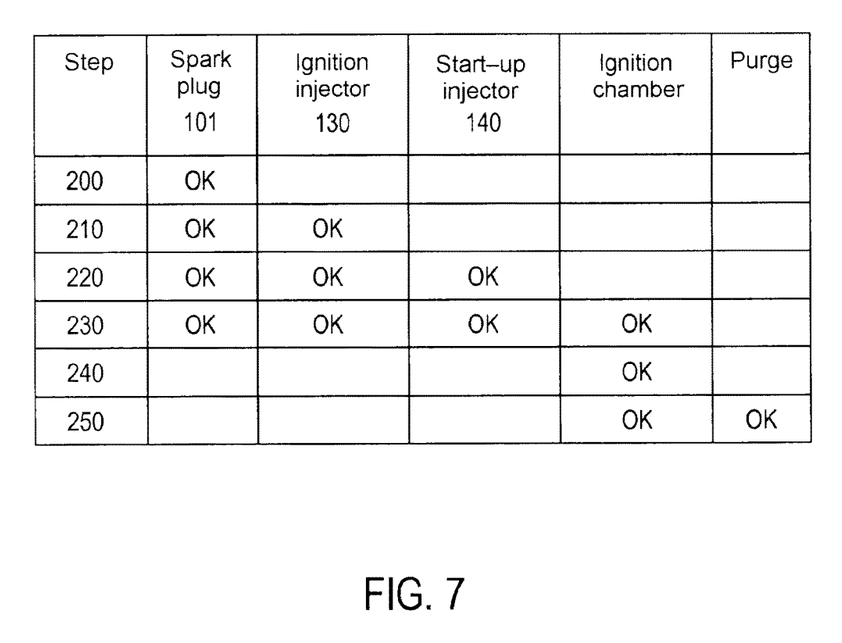
FIG. 7 illustrates a chronology of the ignition of a combustion chamber by an injector according to the invention.

The above arrangement of the fuel injection circuit 120 and the two injectors 130, 140 initiates an ignition cycle of the combustion chamber. The principal steps of this cycle are shown in FIG. 7. The parentheses comprising the terms "OK" indicate that the corresponding object of the column is actuated or is working.

During a step 200, the spark plug 101 is ignited, and fuel at a pressure lower than the setting of the spring circulates in the fuel injection circuit.

During a step 210, fuel enters the ignition circuit and ignites due to the spark plug.

The fuel pressure rises during a step 220 such that fuel continues to enter the ignition circuit and be ignited, while fuel is also injected into the second compartment 107 and ignites on contact with the partition 105. The ignited fuel then enters the combustion chamber.

During a step 230, the quantity of ignited fuel injected into the combustion chamber 10 causes ignition of the latter.

During a step 240, the spark plug and the fuel feed are stopped while the combustion chamber is re-ignited.

Finally, during a step 250, the two chamber ignition circuits and the fuel injection circuit are both purged.

The cycle then repeats a step 200.

The invention claimed is:

1. A combustion assembly for a turbine engine, comprising:
   a turbine engine combustion chamber; and
   a start-up injector for the turbine engine combustion chamber, arranged on a wall of the combustion chamber and leading to the wall of the combustion chamber via an orifice of the wall of the combustion chamber, the start-up injector comprising:
   a fuel injection circuit,
   a fuel ignition circuit comprising a first fuel injector fed by the fuel injection circuit, and an ignitor for igniting a injected fuel,
   a partitioned enclosure comprising a first compartment wherein the ignition of the injected fuel by the ignitor takes place, and a second compartment separated from the first compartment by a thermally conductive partition wall, the first compartment and the second compartment both leading to the combustion chamber via a common fuel evacuation opening and
   a principal start-up combustion circuit, comprising at least one second fuel injector fed by said fuel injection circuit, and leading to the second compartment of the partitioned enclosure by being arranged so as to inject fuel against said thermally conductive partition wall.

2. The combustion assembly for a turbine engine according to claim 1, wherein the fuel injection circuit comprises a fuel supply inlet and an overpressure valve blocking a feed of the combustion start-up circuit when a fuel pressure is less than a predetermined threshold.

3. The combustion assembly for a turbine engine according to claim 2, wherein the predetermined threshold below which the overpressure valve blocks the feed of the combustion start-up circuit is between 2.5 and 3 bar.

4. The combustion assembly for a turbine engine according to claim 1, wherein the at least one second fuel injector of the principal start-up combustion circuit is a pre-vaporization injector adapted to vaporize fuel.

5. The combustion assembly for a turbine engine according to claim 1, wherein the ignitor is a glow plug or a spark plug.

6. The combustion assembly for a turbine engine according to claim 1, wherein the partitioned enclosure includes an external wall fitted with air admission openings.

7. A turbine engine, comprising a combustion assembly according to claim 1.

8. The turbine engine according to claim 7, comprising a casing wherein is arranged the combustion chamber, and the start-up injector being attached to said casing such that:
  the partitioned enclosure enters inside the combustion chamber through the casing and the wall of said combustion chamber,
  and
  air admission openings of an external wall of said partitioned enclosure terminate in an interstice between the casing and the combustion chamber.

* * * * *

UNITED STATES PATENT AND TRADEMARK OFFICE
CERTIFICATE OF CORRECTION

PATENT NO. : 9,927,125 B2  
APPLICATION NO. : 14/432952  
DATED : March 27, 2018  
INVENTOR(S) : Bernard Carrere

Page 1 of 1

It is certified that error appears in the above-identified patent and that said Letters Patent is hereby corrected as shown below:

In the Specification

Column 1, Line 21, change "external walls" to --external 14 walls--.

Signed and Sealed this  
Twenty-fifth Day of February, 2020

Andrei Iancu  
*Director of the United States Patent and Trademark Office*